Patented July 17, 1951

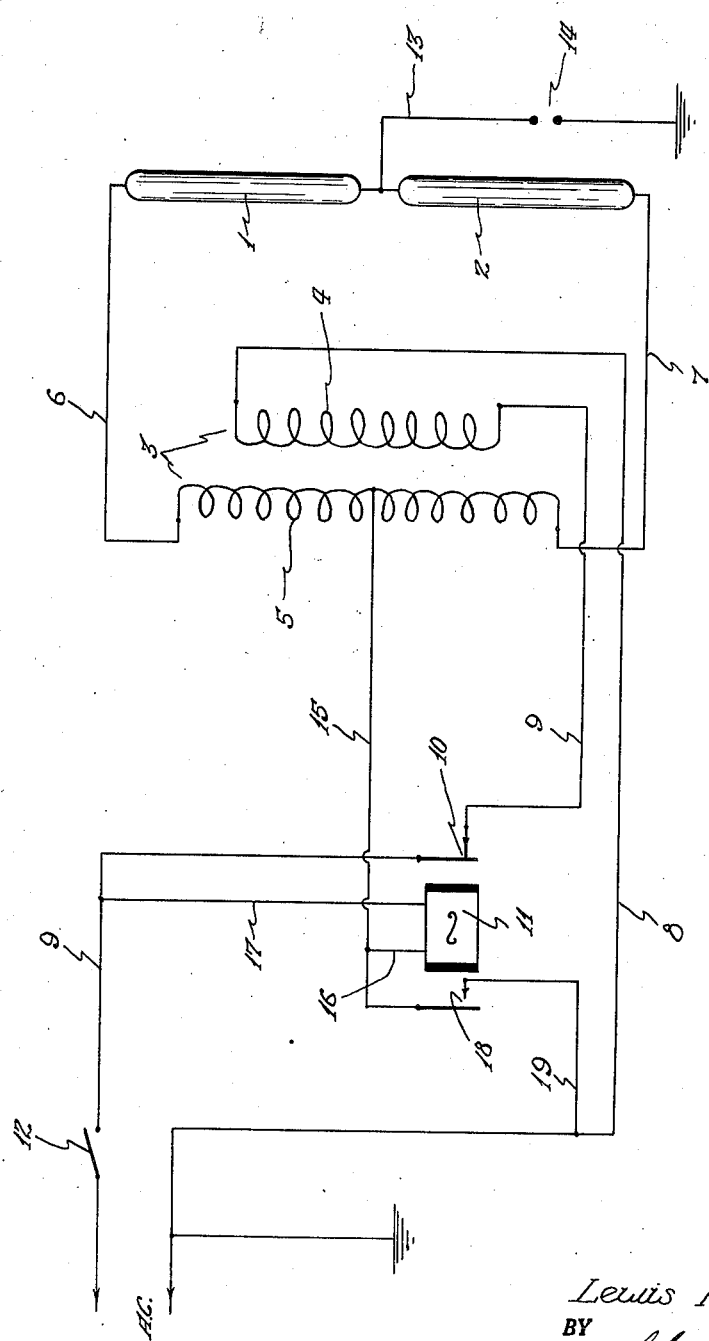

2,560,771

UNITED STATES PATENT OFFICE 2,560,771

PROTECTIVE CIRCUIT FOR GASEOUS CONDUCTION TUBING

Lewis H. Lamont, Chicago, Ill.

Application April 11, 1949, Serial No. 86,731

2 Claims. (Cl. 315—276)

My present invention relates to protective circuits for gaseous conduction tubing.

It is the principal purpose of the present invention to provide a simple effective circuit which can be used with the transformer that supplies current to the tubing so that the primary circuit of the transformer will be opened in case the tube circuit is opened by a burned out tube or is grounded. My invention contemplates the combination with the transformer and tube of a relay and a mid-point ground connection for the tubing so that the relay will operate to open the primary circuit and will lock itself energized in so doing, thus making it necessary to break the supply of current to the relay before the transformer can again be energized.

The nature and advantages of my invention will appear more fully from the following description and the accompanying drawing illustrating a preferred form of the invention. It should be understood however, that the description and drawing are illustrative only and are not intended to limit the invention except as it is limited by the claims.

The drawing illustrates schematically the tube, the transformer and the circuit by which the control relay is associated therewith.

The tubing is illustrated in the drawing as comprising a plurality of tubes 1 and 2. It is customary in lighting these gaseous conduction tubes to use a plurality of tubes in connection with one transformer. The transformer is indicated at 3 and has a primary winding 4 and a secondary winding 5. The secondary winding has its terminals connected by leads 6 and 7 across the tubing 1—2. The primary winding 4 is energized from a suitable source of alternating current by a grounded lead 8 and a return lead 9 which is connected to the source of current through normally closed contacts 10 of a relay 11 and a switch 12.

The tubing 1—2 has a mid-point ground connection 13 which is preferably made through a spark gap 14. With the spark gap 14 in circuit it is not necessary to be very accurate in the placing of the mid-point connection to the tubing. However, the difference in the length of the tubing on opposite sides of the connection 13 should not be over one foot in cases where the total length of the tubing across the transformer is small.

The transformer 3 is insulated from ground and normally placed in a separate metal housing for safety and the separate metal housing is grounded to comply with the national electrical code that transformers must be grounded. A mid-point lead 15 is brought up from the secondary winding 5 of the transformer 3. The lead 15 is connected to the relay 11 by a lead 16, the other side of the relay 11 being connected by a lead 17 to the lead 9 between the switch 12 and the normally closed contacts 10. The lead 15 is connected through normally open contacts 18 of the relay 11 and a lead 19 to the grounded lead 8.

In operation the relay 11, of course, does not interfere with the supply of current of the primary winding 4 of the transformer 3. Any time the manual switch 12 is closed, current is supplied to the winding 4. Now, if one of the tubes 1—2 is broken there is immediately an increasing potential across the secondary winding 5 of the transformer which will cause current to flow across the ground gap 14 and this in turn draws current through the relay 11 to energize the relay. When the relay 11 is energized it opens the normally closed contacts 10 to interrupt the circuit of the primary winding 4. At the same time the normally open contacts 18 are closed to establish a circuit from the alternating current source through the winding of the relay 11 over the leads 17, 16 and 19. The relay will remain energized until the switch 12 is opened and will keep the circuit of the primary winding 4 open at the contacts 10. If either of the leads 6 or 7 become grounded current will also flow through the winding of the relay 11 over the lead 15 to energize the relay and effect opening of the primary circuit. In the event tubing on both sides of the ground lead 13 is broken simultaneously the relay 11 will not prevent high secondary voltage building up on the secondary winding 5, however, it is quite obvious that such a condition would rarely if ever, occur.

It is believed that the nature and advantages of my invention will be clear from the foregoing description. Having thus described my invention, I claim:

1. In a circuit for gaseous conduction tubing, the combination with the tubing of a transformer having a primary winding provided with leads for connection to a source of alternating current, a ground connection for one lead, said transformer having a secondary winding provided with terminals across which the tubing is connected, a ground connection from the mid point of said tubing, a relay, a mid point lead from the secondary winding of the transformer through the energizing winding of said relay to the ungrounded lead from the source of current to the primary winding, said relay having normally open contacts, operable when the relay is energized by flow of current through its coil to connect the mid point lead to the grounded primary lead to the source of current, said relay also having normally closed contacts in one of the leads from the primary winding to the source of current.

2. In a circuit for gaseous conduction tubing, the combination with the tubing of a transformer having a primary winding provided with leads for connection to a source of alternating current, a ground connection for one lead, said transformer having a secondary winding provided with terminals across which the tubing is connected, a ground connection from the mid point of said tubing, said last named ground connection including a spark gap, a relay, a mid point lead from the secondary winding of the transformer through the energizing winding of said relay to the ungrounded lead from the source of current to the primary winding, said relay having normally open contacts, operable when the relay is energized by flow of current through its coil to connect the mid point lead to the grounded primary lead to the source of current, said relay also having normally closed contacts in the ungrounded lead from the primary winding to the source of current.

LEWIS H. LAMONT.

REFERENCES CITED

The following references are of record in the file of this patent:

UNITED STATES PATENTS

| Number | Name | Date |
|---|---|---|
| 2,294,623 | Lebrun | Sept. 1, 1942 |
| 2,305,096 | McDermott | Dec. 15, 1942 |